United States Patent
Egger et al.

Patent Number: 6,109,245
Date of Patent: Aug. 29, 2000

[54] APPARATUS AND METHOD FOR DRIVING A PIEZOELECTRICALLY CONTROLLED FUEL INJECTION VALVE

[75] Inventors: Klaus Egger, Wenzenbach; Christian Hoffmann, Regensburg; Wendelin Klügl, Seubersdorf; Hellmut Freudenberg, Grossberg; Detlev Schöppe, Wenzenbach, all of Germany

[73] Assignee: Siemens Aktiengesellschaft, Munich, Germany

[21] Appl. No.: 09/401,025

[22] Filed: Sep. 21, 1999

Related U.S. Application Data

[63] Continuation of application No. PCT/DE98/00837, Mar. 20, 1998.

[30] Foreign Application Priority Data

Mar. 21, 1997 [DE] Germany .......................... 197 11 903

[51] Int. Cl.⁷ .................................................. H01L 41/04
[52] U.S. Cl. ...................... 123/490; 123/491; 310/316.01
[58] Field of Search .................................. 123/478, 479, 123/490, 491; 310/314, 316.01, 316.02, 316.03, 317

[56] References Cited

U.S. PATENT DOCUMENTS

| | | | |
|---|---|---|---|
| 4,732,129 | 3/1988 | Takigawa et al. | 123/478 |
| 5,130,598 | 7/1992 | Verbeyen et al. | 310/316.03 |
| 5,500,565 | 3/1996 | Okubo | 310/316.02 |

FOREIGN PATENT DOCUMENTS

| | | |
|---|---|---|
| 0379182 | 7/1990 | European Pat. Off. |
| 0611880 | 8/1994 | European Pat. Off. |
| 3621541 | 1/1989 | Germany . |
| 4011782 | 10/1990 | Germany . |
| WO 98/27602 | 6/1998 | WIPO . |

OTHER PUBLICATIONS

Japanese Patent Abstract No. 01041643 (Hidekazu), dated Feb. 13, 1989.

*Primary Examiner*—Tony M. Argenbright
*Attorney, Agent, or Firm*—Herbert L. Lerner; Laurence A. Greenberg; Werner H. Stemer

[57] ABSTRACT

An apparatus for driving a piezoelectrically controlled fuel injection valve includes a piezoelectric actuator having a discharging device and preferably a power MOSFET switch connected in parallel therewith. The discharging device is turned on by a monitoring device that is likewise connected in parallel with the piezoelectric actuator if an opening time of the piezoelectric actuator exceeds a predetermined monitoring time. The discharging device and the monitoring device are constructed as an integrated circuit (ASIC) and are integrated in a valve housing. A method for operating the apparatus is also provided.

8 Claims, 1 Drawing Sheet

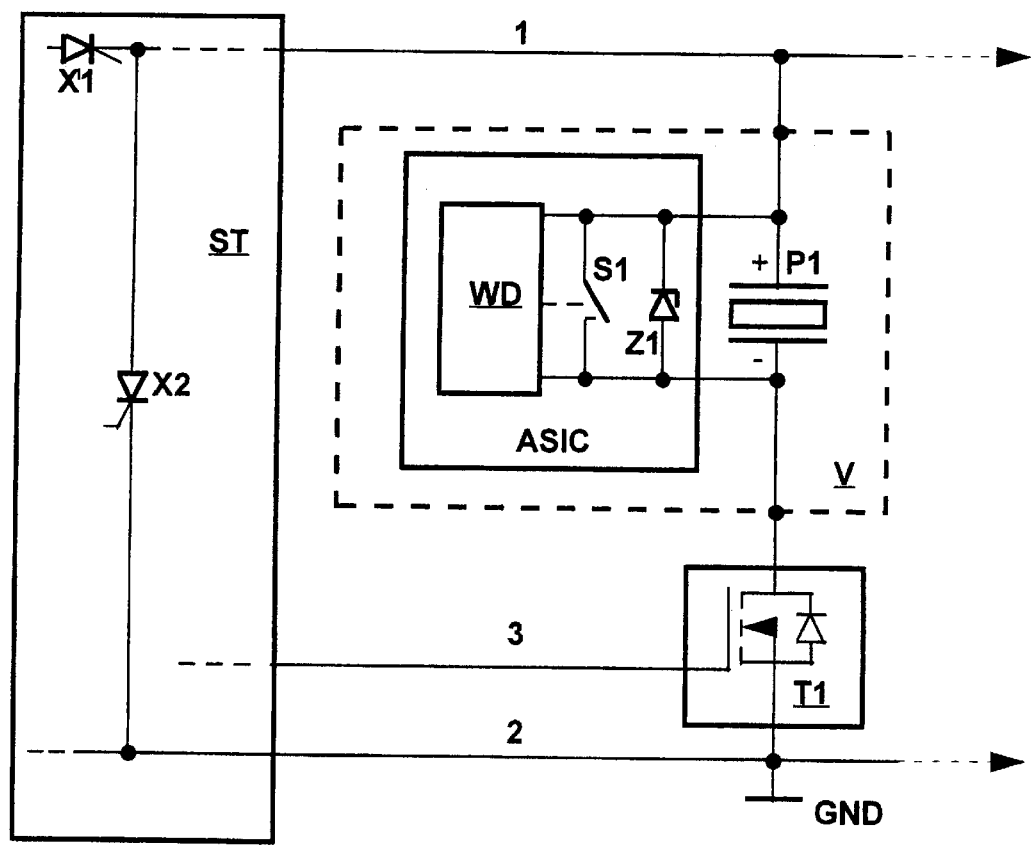

APPARATUS AND METHOD FOR DRIVING A PIEZOELECTRICALLY CONTROLLED FUEL INJECTION VALVE

CROSS-REFERENCE TO RELATED APPLICATION

This application is a continuation of copending International Application No. PCT/DE98/00837, filed Mar. 20, 1998, which designated the United States.

BACKGROUND OF THE INVENTION

Field of the Invention

The invention relates to an apparatus for driving a piezoelectrically controlled fuel injection valve in an internal combustion engine. The invention also relates to a method for operating the apparatus.

In such an apparatus, an incorrect system response due to a fault in the piezoelectric actuator, the control circuit or faulty connections can be detected by monitoring voltage and current waveforms, for example, during the driving operation.

However, if no discharging takes place due to a fault in the control circuit or if a cable breaks in a charged piezoelectric actuator, then although that state can be detected, it cannot be eliminated because the high resistance of a piezoelectric actuator results in the charge that is applied being maintained for a relatively long time. A fuel injection valve actuated by that piezoelectric actuator will remain open for a corresponding length of time and inject too much fuel, which can cause engine damage.

SUMMARY OF THE INVENTION

It is accordingly an object of the invention to provide an apparatus and a method for driving a piezoelectrically controlled fuel injection valve, which overcome the hereinafore-mentioned disadvantages of the heretofore-known apparatuses and methods of this general type in such a way that an opening time (driving time) of a piezoelectric actuator is limited to safe values for a device to be controlled.

With the foregoing and other objects in view there is provided, in accordance with the invention, an apparatus for driving a fuel injection valve, comprising a piezoelectric actuator having an opening time; a charging device for charging the piezoelectric actuator; a discharging device for discharging the piezoelectric actuator; a monitoring device connected in parallel with the piezoelectric actuator; a discharging switch connected in parallel with the piezoelectric actuator and actuated by the monitoring device in the event of a fault; and the monitoring device having a timer turning on the discharging switch if the opening time of the piezoelectric actuator exceeds a predetermined monitoring time.

In the simplest case, the discharging device that is used may be a resistor connected in parallel with the piezoelectric actuator. The resistor is used for discharging the piezoelectric actuator when it is charged and no longer being driven. This resistor must be dimensioned in such a way that, on one hand, the piezoelectric actuator can be discharged quickly enough in the event of a fault but, on the other hand, the additional energy requirement does not become too great.

A better solution is to use an electric coil instead of the resistor. Due to the initially delayed rise in the current in the coil when driving starts, the resultant additional power requirement is also lower.

However, both the resistor and the coil discharge the piezoelectric actuator right after the end of the charging operation, so that it is therefore not possible to obtain any desired length of fault-free opening time for the injection valve.

In accordance with another feature of the invention, the monitoring device is supplied with voltage while the piezoelectric actuator is being charged.

In accordance with a further feature of the invention, there is provided a Zener diode connected in parallel with the piezoelectric actuator, the monitoring apparatus, the discharging switch and the Zener diode constructed as an integrated circuit.

In accordance with an added feature of the invention, the integrated circuit is disposed inside a housing of a fuel injection valve.

With the objects of the invention in view there is also provided a method for operating the apparatus, which comprises dimensioning the monitoring time of the monitoring device to be slightly longer than a maximum opening time of a fuel injection valve required to inject a maximum quantity of fuel at a maximum fuel pressure.

In accordance with another mode of the invention, there is provided a method which comprises carrying out at least two injection operations with opening times not exceeding the maximum opening time for each cylinder filling operation, in a starting phase of an internal combustion engine.

With the objects of the invention in view there is additionally provided a method for operating the apparatus, which comprises turning off the monitoring device in a starting phase of an internal combustion engine.

In accordance with a concomitant mode of the invention, there is provided a method which comprises carrying out the step of turning off the monitoring device with a frequency-modulated signal output by a control circuit.

Other features which are considered as characteristic for the invention are set forth in the appended claims.

Although the invention is illustrated and described herein as embodied in an apparatus and a method for driving a piezoelectrically controlled fuel injection valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic and block circuit diagram of an apparatus for driving a piezoelectrically operated fuel injection valve, as an example of a preferred embodiment according to the invention.

DESCRIPTION OF THE PREFERRED EMBODIMENTS

Referring now in detail to the single FIGURE of the drawing, there is seen a piezoelectric actuator P1 for a fuel injection valve which is represented along with its housing by a unit V. The piezoelectric actuator P1 is disposed between lines 1 and 2 and is connected in series with a power MOSFET switch T1 which is controlled by a control circuit ST over a line 3. Other piezoelectric actuators for fuel injection valves of other cylinders can be disposed in parallel with this series circuit, as is indicated by dashed arrows extending the lines 1 and 2. Details of such a control circuit ST can be found in German Published, Non- Prosecuted Patent Application 196 52 801 A1, corresponding to U.S. patent application Ser. No. 09/335,562, filed Jun. 18, 1999.

The line 2 is connected to a reference-ground potential GND of the circuit, while the line 1 is used to charge the piezoelectric actuator P1 when a charging switch X1 is triggered. A discharging switch X2 is also disposed in the control circuit ST between the lines 1 and 2. The piezoelectric actuator P1 is discharged through the use of the discharging switch X2 and the turned-on power MOSFET switch T1, or through the use of its inverse diode when it is not turned on. The switches X1 and X2 may be thyristor switches, for example.

The invention provides a monitoring device WD for an opening time ta of the piezoelectric actuator P1. The monitoring device WD is connected in parallel with the piezoelectric actuator P1. The monitoring device WD is supplied with energy by the control circuit ST at the same time that the piezoelectric actuator P1 is being charged.

As the piezoelectric actuator P1 is charged, a timer in the monitoring device WD begins to run. After a predetermined monitoring time ts, the timer turns on an electronic switch S1 which is disposed in parallel with the piezoelectric actuator P1, operates as a discharging device and is normally off. The electronic switch S1 thus discharges the piezoelectric actuator P1 in the manner of a short circuit if the piezoelectric actuator is not discharged beforehand through the use of the discharging switch X2.

A Zener diode Z1 which is additionally disposed in parallel with the piezoelectric actuator P1 has a cathode that is connected to a positive connection + of the piezoelectric actuator P1 and protects the piezoelectric actuator against negative voltages and against positive overvoltages not only during operation, but also when disassembled.

The monitoring device WD, the electronic switch or discharging device S1 and the zener diode Z1 are advantageously constructed as an integrated circuit, for example as an ASIC (Application Specific Integrated Circuit), and are disposed inside the housing of the fuel injection valve. The unit V which includes the ASIC and the fuel injection valve is indicated in the drawing by a dashed frame.

A quantity of fuel injected through the use of an injection valve into a cylinder of an internal combustion engine depends on a fuel pressure p and on the opening time ta of the injection valve or of the piezoelectric actuator. The fuel pressure p is predetermined by an engine control device, depending on various parameters. When the engine starts, with the fuel pressure still low (e.g. p=250 bar), a relatively long opening time (e.g. ta=4.5 ms) is required to inject the necessary starting quantity. At a maximum fuel pressure (e.g. $p_{max}$=1500 bar), an opening time $ta_{max}$=1.5 ms, for example, is sufficient to convey a maximum quantity of fuel that is required into an intake pipe or into the cylinder. At this pressure $p_{max}$, the opening time ta=4.5 ms which is required in the starting phase would cause the quantity of fuel in the cylinder to be so great that the result could be damage to the engine.

If the monitoring time ts is limited to a value of ts=1.8 ms, for example, then in the starting phase, with p=250 bar, the necessary quantity of fuel is not obtained and the engine will not start.

It would therefore be necessary to measure the fuel pressure p and match the opening time ta and the monitoring time ts thereto. However, this would require a further signal line for each fuel injection valve and considerable additional circuitry in the monitoring device WD of each fuel injection valve.

It is also possible to turn off the monitoring device WD in the starting phase, which can be done, for example, without an additional line through the use of a frequency-modulated signal output by the control circuit ST to the monitoring device WD over the line 1.

The invention gives preference to a method in which at least two injection operations with an opening time ta not exceeding the maximum opening time $ta_{max}$ are carried out for each cylinder filling operation, in the starting phase of the internal combustion engine, with a low fuel pressure. This enables the necessary starting quantity to be injected without having to turn off the monitoring device in the starting phase, for example with three or four injection operations each lasting a maximum of 1.5 ms at around 250 bar.

This makes it possible to manage with a single, constant monitoring time ts which is selected to be somewhat longer than the maximum opening time $ta_{max}$ that is necessary to inject the maximum quantity of fuel provided at the maximum fuel pressure $p_{max}$, for monitoring the opening time ta of the fuel injection valve over the entire range of engine operation.

We claim:

1. An apparatus for driving a fuel injection valve, comprising:

a piezoelectric actuator having an opening time;

a charging device for charging said piezoelectric actuator;

a discharging device for discharging said piezoelectric actuator;

a monitoring device connected in parallel with said piezoelectric actuator;

a discharging switch connected in parallel with said piezoelectric actuator and actuated by said monitoring device in the event of a fault; and said monitoring device having a timer turning on said discharging switch if the opening time of said piezoelectric actuator exceeds a predetermined monitoring time.

2. The apparatus according to claim 1, wherein said monitoring device is supplied with voltage while said piezoelectric actuator is being charged.

3. The apparatus according to claim 1, including a Zener diode connected in parallel with said piezoelectric actuator, said monitoring apparatus, said discharging switch and said Zener diode constructed as an integrated circuit.

4. The apparatus according to claim 3, wherein said integrated circuit is disposed inside a housing of a fuel injection valve.

5. A method for operating the apparatus according to claim 1, which comprises dimensioning the monitoring time of said monitoring device to be slightly longer than a maximum opening time of a fuel injection valve required to inject a maximum quantity of fuel at a maximum fuel pressure.

6. The method according to claim 5, which comprises carrying out at least two injection operations with opening times not exceeding the maximum opening time for each cylinder filling operation, in a starting phase of an internal combustion engine.

7. A method for operating the apparatus according to claim 1, which comprises turning off said monitoring device in a starting phase of an internal combustion engine.

8. The method according to claim 7, which comprises carrying out the step of turning off said monitoring device with a frequency-modulated signal output by a control circuit.

* * * * *